United States Patent Office 2,716,103
Patented Aug. 23, 1955

2,716,103
PREPARATION OF POLYMER OF VINYL BENZAL ACETOPHENONE

Cornelius C. Unruh and Charles F. H. Allen, Rochester, N. Y., assignors to Eastman Kodak Company, Rochester, N. Y., a corporation of New Jersey No Drawing. Application September 13, 1951, Serial No. 246,518

1 Claim. (Cl. 260—64)

This invention relates to the preparation of polymers of vinyl acetophenone and more particularly to light-sensitive polymers of vinyl benzal acetophenones.

In the Allen et al. U. S. Patent application, Serial No. 771,142, filed August 28, 1947 now U. S. Patent 2,566,302, are described light-sensitive polymers made by the acylation of a polymer such as polystyrene with cinnamoyl chloride. Since acylation apparently proceeds to a limited extent, a polymer is obtained such as one having the following formula:

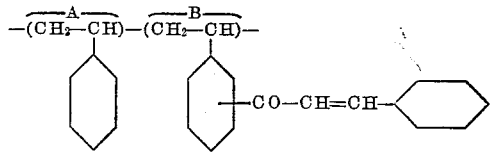

Polymers obtained by this method in which the molecular ratio of unit A to unit B is from 5:1 to 18:1 (16 to 5 mol percent vinyl benzal acetophenone units) are said to possess especially useful photographic properties including solvent solubility and light sensitivity rendering the polymers particularly useful in photomechanical processes.

We have discovered that if polymers of the above type are prepared in the manner of our invention, they are not only more soluble in organic solvents but possess much higher sensitivity to light.

The preferred polymers of our invention are prepared by condensing a polymer of acylated vinyl benzenes and naphthalenes (i. e., ar-vinylacetophenones and ar-vinylacetonaphthones) with a benzaldehyde or naphthaldehyde. This is accomplished in several ways. A polymer containing aromatic nuclei such as a polystyrene or polyvinylnaphthalene or a copolymer threreof is partially or completely acylated by the Friedel-Crafts reaction and the resultant vinyl acetophenone polymer is then condensed with preferably, but not necessarily, an excess of the selected aromatic aldehyde of from about 1/10 to about 25–50 mol of aldehyde per mol of polymer to yield the desired polyvinyl arylidene acetophenone. Alternately, a vinyl acetophenone, vinyl propionphenone, etc. compound can be homopolymerized or copolymerized with other compounds containing a polymerizable —CH=C< or $CH_2$=C< group, such as styrene, and the resultant polymer condensed with the aromatic aldehyde under consideration.

The following reactions illustrate methods of carrying out our invention:

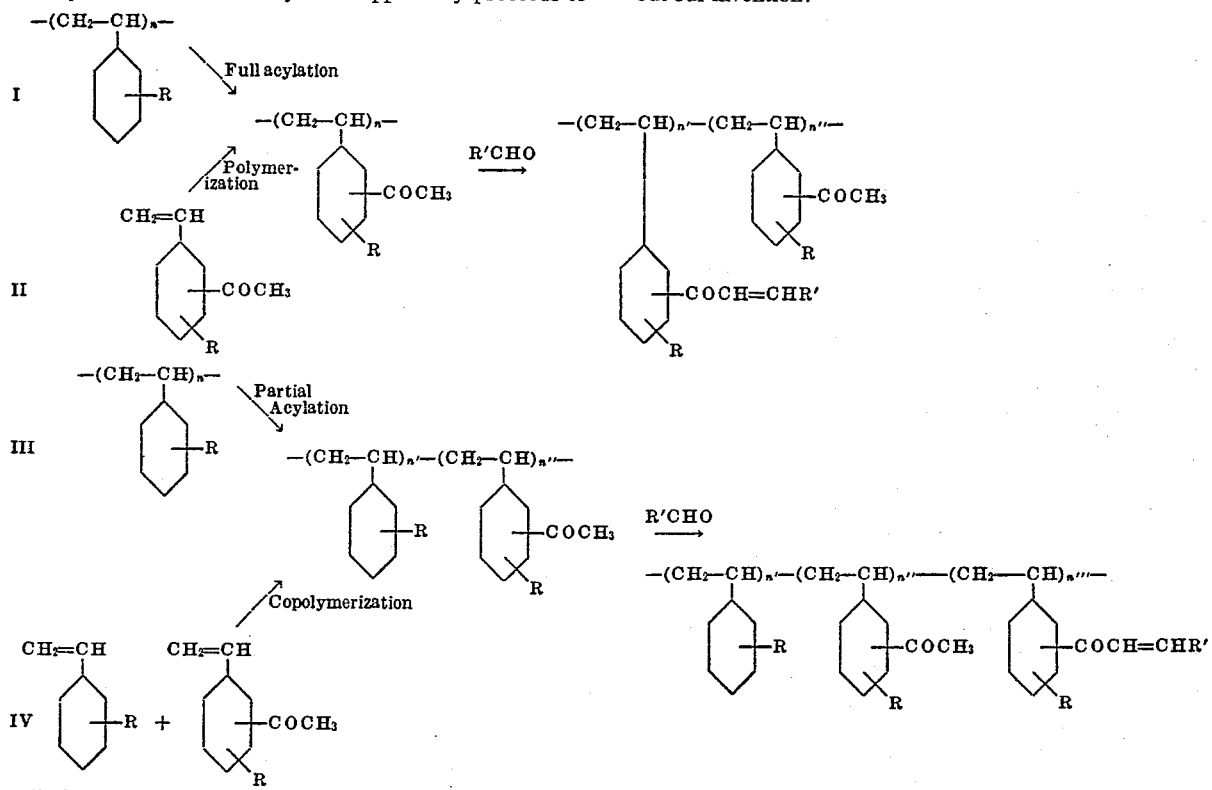

R' represents a phenyl or α- or β-naphthyl group substituted or not with one or more groups such as o-methoxy, o-sulfo, o-hydroxy, o-chloro, etc. R represents a group such as hydrogen, alkoxy and aryloxy, e. g. o-methoxy, p-phenoxy, alkyl, e. g. m-tert-butyl and methyl, hydroxy, e. g. o-hydroxy, halogen, e. g. o-chloro, aralkyl, e. g. p-benzyl etc. The nucleus can be substituted with more than one of such groups, e. g. 3,4-dichloro, 2,5-dimethyl, 3,4-dihydroxy, 2,5-dichloro, 2,3-dimethyl. Similarly the substituents may be present on a naphthalene nucleus when preparing the acylated vinyl-naphthone polymers. When the polymers reacted with the aldehyde or mixture of aldehydes, is obtained by acylation of a vinyl benzene or naphthalene polymer (methods I and III), the acid halide used may be any one of a mixture of those containing 2–5 carbon atoms such as acetyl, propionyl, butyryl and valeryl chlorides. Acetyl chloride is preferred since the vinyl benzalacetophenone and acetonaphthone polymers are more light sensitive than e. g. vinylbenzalpropionphenone polymers. Likewise, according to methods II and IV., the carbon chain of the ketone groups of the monomeric compound preferably contains 2–5 carbon atoms. The Williams U. S. Patent application Ser. No. 246,524 filed concurrently herewith provides a convenient method for preparing these ketones for example from p-ethyl acetophenone. When R of the acylated compounds is amino, hydroxyl, sulfo and carboxyl, methods II and IV and the Williams procedure for preparing the ketone monomers is used. In the formula in the above chart the values for the integers $n$, $n'$, $n''$ and $n'''$ are dependent somewhat upon the molecular weight of the polymer reacted with the aldehyde. $n''$ in methods I and II and in methods III and IV can be positive integers, or equal to zero in case of the acetyl groups of the polymer have been reacted with the aldehyde as shown in the examples following. In the formula it will be apparent that when a mixture of aldehydes including benzaldehyde is reacted with the acylated polymer, the resultant polymer contains a mixture of vinyl aralacetophenone units.

When the polymers of our invention are obtained as described, regardless of the derivation of the particular acylated polymer which is condensed with the aromatic aldehyde, the resultant products are in general more sensitive to light than those produced by the methods of the Allen et al. invention. In making this comparison, sensitivity to light is determined by exposure of a layer of the polymer on a hydrophilic surface under a photographic step tablet to insolubilize the polymer in the exposed regions. After exposure, the least exposed areas are removed with a solvent for the polymer such as methyl ethyl ketone. The sensitometric characteristics of the undissolved polymer remaining in the form of a step tablet are then recorded by well known photographic methods. From these values a speed value is assigned to the particular polymer under test. When tested by this method, representative polymers of the Allen et al. invention possess speeds of from 1.4 to 7 (made by reacting from 1:5 to 1:18 mols of cinnamoyl chloride per mol of styrene polymer) whereas none of the polymers of our invention have speeds less than 7 and speeds of the order of 1000 to 8000 are readily obtained by selection of the proper reactants and conditions of reaction.

A possible explanation for the fact that the polymers of our invention in general possess such relatively higher light sensitivity, lies partly in a belief that substantially no cross-linkages are formed in the polymers obtained by our methods. That is, it is believed that when a polymer containing aromatic nuclei is cinnamoylated by the methods of the Allen et al. invention, the catalyst utilized induces the formation of cross-linkages which reduce light sensitivity and which tend to insolubilize the polymer before very many cinnamoyl groups have been introduced into the molecule. On the contrary, by our methods we start from a polymer containing the desired proportion of vinyl acetophenone units. Subsequent reaction of the polymer with an aromatic aldehyde appears to yield a polymer substantially free of cross-linkages. By our methods we readily obtain polymers containing at least 21 mol per cent of vinyl benzal acetophenone units and such resins apparently due to the increased number of unsaturated groups present and freedom from cross-linkages, possess speeds of the order of 1000–8000. Even vinyl benzal acetophenone copolymer (Example 6) which contains substantially less than 21 mol per cent of light-sensitive groups, is very light sensitive.

In general, the polymers of our invention are polymers of a compound having the general formula:

$$CH_2=CH-D-CO-CH=CH-Q$$

wherein D represents an aryl group of the benzene or naphthalene series substituted or not with groups, for example, alkyl, alkaryl, halogen, hydroxy, alkoxy, aryloxy, amino, etc. as above indicated, and Q is a phenyl or naphthyl group substituted, or not with for example the groups: alkyl, alkoxyl, hydroxyl, halogen, acetamido, alkoxy, aryloxy, amino sulfonic acid, etc., as indicated above.

For example, polymers of the following are contemplated by our invention:

α-naphthal acetylstyrene
Isopropylbenzal acetylstyrene
p-hydroxybenzal acetylstyrene
p-dimethylamino acetylstyrene
o-chlorobenzal acetylstyrene
p-acetamidobenzal acetylstyrene
p-sulfobenzal acetylstyrene
anisal acetylstyrene
Veratral acetylstyrene
Anisal acetyl-o-methoxystyrene
p-hydroxybenzal acetyl-o-methoxystyrene
o-chlorobenzal acetyl-o-chlorostyrene
o-chlorobenzal acetyl-p-benzylstyrene
p-sulfobenzal acetyl-2,5-dimethylstyrene
Anisal acetyl-p-phenoxystyrene
Anisal acetyl-p-bromostyrene
Tolual acetyl-3,4-dimethoxystyrene
Anisal acetyl-o-fluorostyrene
Benzal acetyl-o-methoxystyrene
Benzal acetyl-o-, m-, p-chlorostyrenes
Benzal acetyl-o-, m-, p-bromostyrenes
Benzal acetyl-p-benzylstyrene
Benzal acetyl-p-phenoxystyrene
Benzal acetyl-3,4-dichlorostyrene
Benzal acetyl-2,5-dimethylstyrene
Benzal acetyl-m-methylstyrene
Benzal acetyl-m-tert. butylstyrene
Benzal acetyl-3,4-dihydroxystyrene
Anisal benzal acetylstyrene
Anisal methyl vinyl ketone The latter compound is representative of other light-sensitive benzalacetyl and naphthalacetyl group-containing polymers made by condensing aromatic aldehydes with polymers containing acetyl groups, such as vinyl methyl ketone polymers and co-polymers. Other polymers also containing acetyl groups attached directly or indirectly to linear carbon atom polymer chains are utilized similarly. Anisal benzal acetylstyrene is representative of polymers obtained by reacting a mixture of aldehydes with the polymer containing acetyl groups.

Accordingly, the light-sensitive polymers contain the group

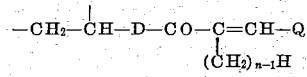

in which $n$ is a number from 1 to 4 and Q is an aryl group of the benzene or naphthalene series (substituted or not) and D is a single bond or aryl group of the benzene or naphthalene series.

In general, the preferred polymers are obtained by condensing a polymer (homopolymer or copolymer) of a compound having the general formula:

$$CH_2=CH-D-CO-CH_3$$

wherein D is the same as above, in the presence of an alkaline condensation catalyst, with a benzaldehyde, the nucleus of which may contain the substituent of Q above. Preferably but not necessarily is used an excess of the aldehyde based upon the amount of vinyl acetophenone units present in the polymer molecule.

As the alkaline condensation catalyst are used the quaternary ammonium bases such as trimethylbenzylammonium hydroxide, tetramethyl and tetraethyl ammomonium hydroxide, tetraethanol ammonium hydroxide, trimethylbenzyl ammonium butoxide, sodium hydroxide, sodium methoxide, etc. In the Unruh and Allen U. S. patent application Serial No. 246,516, filed concurrently are disclosed and claimed comparable methods for preparing vinylbenzal acetophenone polymers using an acid as the condensation catalyst which in general does not produce polymers of as high light sensitivity.

As described above, specific methods include acetylating either partially or fully, aromatic nuclei of a styrene polymer (homopolymer or copolymer) and then condensing acetyl groups thereof with a benzaldehyde or naphthaldehyde. Alternately, an acetylated styrene copolymer is obtained by copolymerization of a mixture of a vinyl acetophenone with a compound containing a polymerizable

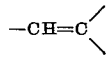

group, particularly a

group, followed by condensing acyl groups of the polymer with the selected aromatic aldehyde As will be apparent from the following examples given as illustrative of the methods of our invention, condensation with the aldehyde is preferably conducted in the presence of a diluent, which should be a solvent for both the vinyl acetophenone or acetonaphthone polymer and the aldehyde in use, such as 1,4-dioxane or ketones such as benzophenone, etc. It is particularly desirable to use as the solvent large excesses of the aldehydes in addition to the primary solvent, or, as shown in the examples, to use only the aldehyde reactant as solvent which increases the arylidene content of the polymer. It is advisable to use a diluent, otherwise in some cases the product tends to decrease in solubility during the course of the condensation. It is possible to employ as the diluent the original diluent used when making the vinyl acetophenone polymer or copolymer. That is, when vinyl acetophenone or acetonaphthone is homopolymerized or copolymerized with another polymerizable compound in a diluent, the polymer need not be isolated but the polymerization mixture can immediately be reacted with the desired aldehyde without removal of the diluent. Any unpolymerized monomer which may remain in the polymerization mixture does no harm when the condensation is subsequently carried out in its presence. As a source of the aldehyde for the condensation reaction may be used the pure aldehydes, or mixtures of two or more aldehydes can be used and the aldehyde may be furnished by an acetal, for example, a benzaldehyde acetal, or the diacetate may be used. These compounds readily decompose in the presence of the condensation catalyst to yield the corresponding aldehyde.

In the following table are tabulated the comparative speed values for polymers made by condensing various aldehydes with a selected vinyl acetophenone polymer:

| Example | Polymer | Aldehyde | Speed |
| --- | --- | --- | --- |
| 12 | VAcP* | benzaldehyde | 8,000 |
| 2 | VAcP* | anisaldehyde | |
| 3 | VAcP* | p-dimethylaminobenzaldehyde | 10 |
| 4 | VAcP* | p-acetaminobenzaldehyde | 7 |
| 13 | VAcP* | o-sulfobenzaldehyde | 180 |

* Vinylacetophenone (acetylated styrene).

*Example 1.—The preparation of polyvinyl acetophenone*

In an all glass vessel equipped with efficient stirrer, dropping funnel and reflux condenser was placed 268 g. (2 mols) of finely divided anhydrous aluminum chloride and 1 liter of carbon disulfide. To the constantly stirred suspension was added 118 g. (1½ mol.) of acetyl chloride followed by a solution of 104 g. (1 mol.) of polystyrene in 1 liter of carbon sulfide. Addition of the polymer solution took about 15 minutes. The reaction mixture became warm and refluxed gently, with copious evolution of hydrogen chloride. No artificial heating or cooling was used. After about ½ hour the evolution of hydrogen chloride had greatly diminished, but stirring was continued another hour. The reaction mixture was then filtered by suction, about 75% of the carbon disulfide used was thus recovered, and the residue on the filter consisted of highly swollen discrete particles. These were dried rapidly in a gentle current of air to give a dusty yellow powder, which was thoroughly agitated with cold 5% hydrochloric acid for about 15 minutes. The polymer was filtered off and washed by stirring in several changes of cold water. On drying at 40–50° C. there was obtained 142–144 g. of fine, white powder of low ash content. The analysis of this product showed a carbon content of 81.9% and a hydrogen content of 6.9%. The calculated values for pure polyvinyl acetophenone are C=82.2%, H=6.85%.

The above polymer, proven to consist essentially of polyvinyl-p-acetophenone, may be further purified by dissolving it in acetone and pouring the colorless, slightly hazy solution into an excess of agitated water. The white, fibrous precipitate is again washed with water and dried. Found C=82.3%, H=7.0%.

The other acylated nuclear substituted styrene and vinylnaphthalene polymers indicated above are prepared in this manner from the appropriate styrene or vinylnaphthalene polymer. Also, these polymers can be obtained by polymerizing o-, m- and p-vinylacetophenones and acetonaphthones prepared by the methods of the Williams invention above.

*Example 2.—Condensation of polyvinyl acetophenone with anisaldehyde*

Polyvinylacetophenone prepared as above was treated in a solution of an excess of anisaldehyde, with trimethylbenzylammonium hydroxide catalyst, for about 10 minutes followed by neutralizing the catalyst with acetic acid, precipitating and leaching the resin in ethyl alcohol. The product was light sensitive to a high degree.

*Example 3.—Condensation of polyvinyl acetophenone and p-dimethylamino benzaldehyde*

5.0 grams of polyvinyl acetophenone were dissolved in a mixture of 10 grams of p-dimethylamino benzaldehyde and 90 grams of benzophenone at 50° C. With the solution at 40° C. there was added to it 1.0 m. of 40% solution of trimethyl benzyl ammonium hydroxide with vigorous stirring. After exactly 3 minutes at 40° C. a slight excess of glacial acetic acid was added to neutralize the base present. The resulting solution was poured into an excess of stirred methanol and the yellow, rubbery polymer was redissolved in methyl ethyl ketone. The solution was now precipitated into excess alcohol. Finally the polymer was again dissolved in methyl ethyl ketone and poured into excess, agitated warm water. The yellow fibrous polymer was dried at room temperature. The polymer showed a speed of 10.

*Example 4.—Condensation of polyvinyl acetophenone and p-acetamino benzaldehyde*

5 grams of polyvinyl acetophenone were dissolved in a mixture of 10 g. of p-acetamino benzaldehyde and 75 cc. of dried 1,4-dioxane. 1.0 g. of a 40% solution of benzyl trimethyl ammonium hydroxide were added. After exactly five minutes of stirring there was added a slight excess of glacial acetic acid to neutralize the base present. The solution was poured slowly into an excess of stirred methanol. The precipitate was again precipitated from methyl ethyl ketone into methanol and finally precipitated from methyl ethyl ketone into warm water. The white, fibrous polymer was dried at room temperature. The polymer showed a speed of 7.

*Example 5.—Preparation of a copolymer of vinyl acetophenone and isobutylene*

160 grams of a copolymer of styrene and isobutylene (consisting of essentially equimolecular proportions of the two monomers) were dissolved in 1 liter of carbon disulfide. In a 5-l. flask fitted with an efficient glass stirrer, condenser and dropping funnel was suspended 268 g. of anhydrous aluminum chloride in 1 liter of carbon disulfide. To this was then added 118 g. of acetyl chloride. While this suspension was well stirred, the solution of the polymer was added over a period of ten minutes. Copious evolution of the hydrogen chloride took place and a loose bulky precipitate formed. After the addition of the polymer was complete, stirring was continued for another hour. The product was filtered and the crumby polymer dried in a current of air. The dried polymer was crushed up fine and stirred up with an excess of ice cold 5% hydrochloric acid solution. The polymer was filtered off by suction and washed thoroughly with water to remove excess acid. Dried at 40° C. Yield about 180 grams.

*Example 6.—Condensation of a copolymer of vinyl acetophenone and isobutylene with anisaldehyde*

The copolymer of Example 5 was dissolved in benzophenone or 1,4-dioxane and treated with alkaline catalyst and anisaldehyde as in Examples 3 and 4, to obtain a light-sensitive solvent soluble polymer.

*Example 7.—The preparation of monomeric vinyl acetophenone*

Polyvinyl acetophenone (prepared by the reaction of acetyl chloride on polystyrene in the presence of anhydrous aluminum chloride, as described in the Kenyon et al. U. S. patent application, Ser. No. 246,519, filed concurrently herewith) was heated in a distilling apparatus with the bare flame of a gas burner, the system being evacuated to 1 mm. pressure. 85% yield of a light brown oil was obtained which readily crystallized on chilling. This product was redistilled and a very pale yellow oil was collected which distilled at 93–98° C. at 0.5 mm. Hg. pressure.

The distillate crystallized and this was recrystallized twice from ligroin (B. P. 60–90° C.) by chilling the solution thoroughly. White crystalline plates were obtained which melted at 34° C. Titration of a sample of this for double bond by means of bromine indicated a 98.9% content of vinyl acetophenone.

The isomeric vinylacetophenones and acetonaphthones can also be prepared by the methods of the mentioned Williams invention.

*Example 8.—The copolymerization of vinyl acetophenone with styrene*

5 grams of vinyl acetophenone were mixed with 3.6 g. of freshly distilled styrene together with 0.043 g. of benzoyl peroxide and 25 cc. of methyl ethyl ketone. This solution was refluxed gently on the steam bath for twenty-four hours. The resulting viscous, clear, colorless solution was poured into an excess of agitated methanol. The white, friable polymer was leached in fresh methanol, then dried at 40° C. Found=84.1%, H=7.2%. Calculated C, 86.4%; H, 7.2%.

*Example 9.—Condensation of copolymer of styrene and vinyl acetophenone with anisaldehyde*

The copolymer prepared as above (Example 8) was condensed with excess anisaldehyde as in the previous examples to obtain a light-sensitive solvent soluble polymer.

*Example 10.—The preparation of a partially acetylated polystyrene*

52 grams of polystyrene were dissolved in 500 cc. of carbon disulfide. This was added to a suspension of 62 g. of anhydrous aluminum chloride in 500 cc. of carbon disulfide contained in a 3-liter glass flask fitted with an efficient glass stirrer, condenser and dropping funnel. While the mixture was being vigorously stirred, a mixture of 30 g. of acetyl chloride and 100 cc. of carbon disulfide were added dropwise. During this addition the reaction mixture soon became thick and gelatinous and another 500 cc. of carbon disulfide were added. Stirring was continued and more of the acid chloride mixture was cautiously added and soon the gel structure collapsed and a suspension of highly swollen polymer particles suspended in the carbon disulfide was obtained. The remainder of the acid chloride could now be added at a faster rate. Copious evolution of hydrogen chloride was observed and stirring was continued for another hour after the addition of the acid chloride was complete. The mixture was then filtered and dried in a current of air. The crumbly product was broken up fine and added to a well-stirred ice cold 5% hydrochloric acid solution. The white suspension was filtered off and washed with water and dried. The white, dry polymer was dissolved in dioxane, the solution filtered and the filtrate was poured slowly into an excess of agitated methanol. The white, fibrous precipitate was washed thoroughly in water, then dried at 40° C.

*Example 11.—Condensation of a partially acetylated polystyrene with veratraldehyde*

The polymer of Example 10 was condensed with excess veratraldehyde in a solution in 1,4-dioxane as in the foregoing examples to obtain a light-sensitive soluble resin.

*Example 12.—Alkaline condensation of polyvinyl acetophenone with benzaldehyde*

10 grams of polyvinyl acetophenone (Example 1) were dissolved in 190 g. of benzaldehyde Three ml. of a 40% solution of trimethyl benzyl ammonium hydroxide were stirred into the solution. A drop or two of the solution was mixed with water containing a little phenolphthalein. The reaction was not alkaline, so a further 2 ml. of the solution were added. This time the test showed strong alkalinity. Ten minutes after the addition of the basic solution a noticeable increase in viscosity of the solution was apparent. A slight excess of glacial acetic acid was now added to the solution to destroy the remaining basic catalyst. The clear solution was poured into an excess of stirred ethyl alcohol, the fibrous precipitate being leached in two fresh changes of ethyl alcohol. The polymer was reprecipitated from methyl ethyl ketone solution by pouring it into excess ethyl alcohol. The nearly white, fibrous precipitate was dried in the dark at room temperature.

Estimation of the degree of substitution by bromine absorption measurement indicated a value of 80.2%. Sensitometric measurements indicated that it had a speed of approximately 8000.

*Example 13.—The condensation of polyvinyl acetophenone with sodium o-sulfo-benzaldehyde*

5 grams of polyvinyl acetophenone were dissolved in a mixture of 80 cc. of dioxane and 20 cc. of alcohol. 10 grams of sodium o-sulfobenzaldehyde (the technical product was twice recrystallized from alcohol) were added to the stirred solution. With efficient stirring there was added to the slurry 20 g. of a solution made up of one part by weight of a 40% solution of trimethylbenzyl hydroxide and 19 parts of water. The addition was made dropwise over a period of 10 minutes. The resulting solution was clear, but after 30 minutes it began to show cloudiness. 5 cc. were added to clear it, followed by another 5 cc. 30 minutes later. After standing for a total of two hours at room temperature the solution was acidified with a little acetic acid and poured into an excess of acetone. The precipitate was filtered off and redissolved in water containing a little acetone. Again the solution was poured into excess acetone. The precipitate was dissolved again in aqueous acetone and precipitated in excess acetone. The precipitate was then leached in fresh acetone, filtered off and dried in vacuo. The product was soluble in 25% (by weight) of acetone in water or a 30% solution (by weight) of alcohol in water. Speed=180.

*Example 14.—Condensation of polyvinyl acetophenone with β-naphthaldehyde*

Polyvinyl acetophenone prepared as in Example 1 was treated with excess β-naphthaldehyde in 1,4-dioxane solution as in the previous examples to obtain a light-sensitive solvent-soluble polymer containing a high percentage of vinylnaphthalacetophenone units.

In analyzing the vinyl benzal acetophenone and acetonaphthone polymers for their content of benzal groups, two methods were used. The first involved titration of the double bond in the polymer with bromine. The second method which appeared to be most reliable involved recording the spectral absorption in a spectral photometer at wavelengths 7.35 and 7.50 microns, using the absorption of the solvent pure chloroform for fixing the $I_0$ level. The analysis shown above was based on the latter method.

In addition to the vinyl acetophenone copolymers given in the above examples can be used acylated polymers of e. g. α-methyl-, m-methyl-, 2,5-dimethyl- or ethyl styrenes, o-hydroxy-, o-, m-, p-chloro-, or bromo-, p-benzyl, 3,4-dichloro-, 3,4-dimethoxy-, m-tert.butyl-, styrenes, o-methoxy styrene, p-phenoxy styrene, etc., copolymers of mixtures of 5–95 mol per cent of these styrenes or of these styrene polymerized with polymerizable compounds such as styrene, acrylonitrile, vinyl acetate, vinyl ethers, acrylic and alkacrylic acids and esters, maleic anhydride, etc. The homologous vinyl propiophenone etc. polymers are of less value for the preparation of light-sensitive polymers. However, copolymers containing both vinyl acetophenone and vinyl propiophenone units are very useful in the invention. The Kenyon et al. invention above provides other acylated polymers which are useful in our invention.

In general, the polymer reacted with the aldehyde need only contain a selected proportion, 100 mol per cent or less, of the indicated —$CO(CH_2)_{n-1}CH_3$ groups where $n$ is 1 to 4. To this end the vinyl ketone polymers such as methyl vinyl ketone homopolymers or copolymers with other polymerizable compounds such as methyl methacrylate, are also useful. In this case the arylidene acetyl group obtained is attached directly to carbon chain of the polymer rather than indirectly as is the case when the aldehyde is reacted with polymers such as polyvinyl acetophenone.

Results similar to those of the above examples are obtained by condensing the benzaldehyde as above with homopolymers and copolymers of the o-, m- and p-acylated styrenes and vinyl naphthalenes prepared by the methods of the Williams invention. For example, substantially no difference in physical and chemical properties could be detected between the vinyl benzalacetophenone polymer of Example 12 and one obtained from p-vinylacetophenone (from p-ethylacetophenone) by condensation with benzaldehyde.

The polymers of the invention can be sensitized so as to further increase their sensitivity to light by use of the nitro compounds of Minsk et al. U. S. patent application Ser. No. 148,684, filed March 9, 1951, now U. S. Patent 2,610,120, and the triphenylmethane, anthrone, quinone and ketone compounds of the Minsk et al. applications Ser. Nos. 207,048–51, filed January 20, 1951 now U. S. Patents 2,690,966, 2,670,285, 2,670,286 and 2,670,287, respectively, particularly those acylated vinyl benzene and naphthalene polymers having inherently low light sensitivity before sensitization, of the order of 100. Contrary to this, the light-sensitive polymers of the Allen et al. invention above are not sensitized by these compounds.

The polymers of the invention are particularly useful for photomechanical purposes where it is desired to prepare a resist image on a given surface. For example, the polymer is coated from solvent upon a support such as a metal plate, paper or organic colloid surface; for example, especially upon a surface which when moistened repels greasy printing inks such as a lithographic paper plate, and after exposure to the desired line or halftone subject, the unexposed areas are dissolved away, leaving a resist image on the original support. At this stage, if the resist has been formed on a surface repelling greasy inks when moistened, the element can be used directly as a printing plate. In other cases, the support, such as a metal plate, can be etched out in a well known manner to obtain an etched metal printing plate. Other uses for our polymers employing their light-sensitive properties will occur to those skilled in the art. For example, the polymers can be employed to form continuous or discontinuous soluble or insoluble coatings on any surface or object to which they will adhere, in the latter case exposure to light being employed to insolubilize the coating.

The light-sensitive polymers can be used for photographic reproduction of line, halftone or continuous tone subjects. In the latter case it is preferable to coat the polymer on a transparent support, expose the coating through the support followed by washing away the least exposed areas with solvent leaving a continuous tone relief image on the support which may be colored previously or subsequently with subtractively colored dyes or for purposes of color photography. Three such subtractively colored reliefs corresponding to blue, green and red aspects of a subject can then be superimposed to obtain a natural color reproduction or three such images may be formed on a single support by successively coating layers of the polymers on the support after first forming relief images thereon corresponding to one or more of the red, green, or blue aspects of the original subject. Thus, after forming a yellow colored relief on the support, a layer of polymer is coated thereon and the magenta relief is formed on top of the yellow relief and the cyan similarly.

What we claim is:

A process for preparing a polymer which comprises condensing polyvinyl-p-acetophenone with benzaldehyde in the presence of trimethyl benzyl ammonium hydroxide as a condensation catalyst.

References Cited in the file of this patent

UNITED STATES PATENTS

| | | |
|---|---|---|
| 2,320,817 | D'Alelio | June 1, 1943 |
| 2,341,016 | Brubaker | Feb. 8, 1944 |

OTHER REFERENCES

Fieser et al.: Organic Chemistry, Heath & Co., 1950, pages 714 and 715.

Coombs et al., Jour. Chem. Soc. 1940, pages 1295–1300.